June 24, 1930.   C. A. VAN DUSEN   1,766,471
STRUCTURAL MATERIAL
Filed Sept. 16, 1927

INVENTOR
Charles A. Van Dusen
BY
Kwis Hudson & Kent.
ATTORNEYS

Patented June 24, 1930

1,766,471

UNITED STATES PATENT OFFICE

CHARLES A. VAN DUSEN, OF CLEVELAND, OHIO, ASSIGNOR TO THE GLENN L. MARTIN COMPANY, OF CLEVELAND, OHIO, A CORPORATION OF OHIO

STRUCTURAL MATERIAL

Application filed September 16, 1927. Serial No. 219,875.

This invention relates to improvements in reenforced cellular rubber materials for structural purposes, particularly a material of this kind in sheet form embodying a reenforcement of flexible sheet metal. The present application is a continuation in part of my prior application Serial No. 108,279, filed May 11, 1926.

One of the objects of the invention is the fabrication of a sheet material of a high strength-weight ratio that may be employed in lieu of wood. One of the prime adaptations for this novel material is found in aeronautical structures wherein the requirements are of the most rigid and exacting nature along the lines above indicated, and wherein the qualities of being non-warpable and impervious to water are of extreme importance, and inherently present in my improved structural material.

Ordinary vulcanized rubber is not adapted for the practical requirements of aeronautical structures because of its liability to fracture, and its relatively high density and high cost, although the material itself possesses inherent marked advantageous qualities. Accordingly, I have not only supplied the rubber or rubber compound with suitable reenforcement, as hereinafter explained, but I have provided a cellular fabricated product possessing minimum density and maximum strength by vulcanizing a hard rubber compound mixed with a blowing agent, said compound being intimately associated during vulcanization with thin, flexible sheet metal, particularly metal supplied with a multiplicity of holes or spaces that are adapted to act as anchors for the rubber compound.

In the drawing, Fig. 1 is a perspective view, somewhat diagrammatic in character and slightly broken away, illustrating a rectangular section of my improved reenforced cellular rubber.

In the manufacture of cellular reenforced rubber, in accordance with the invention described in my application above referred to as well as in the instant improvement, the cellular structure of the body portion of the article is limited to a moderate expansion during the heating and hard vulcanizing process, whereby the cells are kept of minute size, insuring strength and low density for most purposes. However, the strength of vulcanized cellular rubber per se is insufficient and the material itself is readily fractured.

Accordingly, the vulcanized cellular rubber has intimately associated therewith a reenforcement of either perforated or unperforated, flexible sheet metal.

Figure 3:
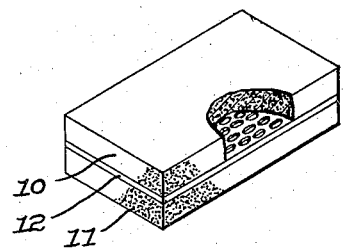
Fig. 3 is also similar to Fig. 1 but illustrates one reenforcement only located in the central plane of the material.
Figure 2:
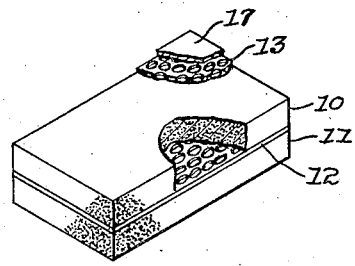
Fig. 2 is similar to Fig. 1 but shows two reenforcing elements instead of three.
Figure 1:
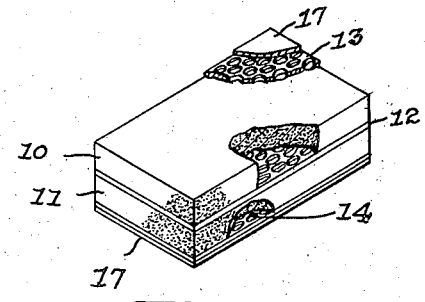

Figs. 1 to 3 inclusive disclose a material made up of two layers of hard vulcanized cellular rubber 10 and 11 with a perforated sheet metal reenforcing plate 12 interposed between them and intimately associated therewith. On the outer surface of the layer 10 in each of Figs. 1 and 2, there is a similar reenforcing sheet 13, while in Fig. 1 there is a further such sheet 14 on the outer surface of the layer 11. The reenforcing sheets are made to adhere to the body of the material preferably by performing the vulcanizing operation with the reenforcing sheets in place so that the rubber is vulcanized onto the metal sheets. Also during the vulcanization the rubber is subjected to sufficient pressure to cause it to flow into the holes in the sheets 12, 13 and 14 and thereby to form an anchorage. While it is not essential that the holes extend through the sheets, I prefer to have them do so as the bond between the reenforcement and the sponge rubber is thereby improved.

Figure 4:
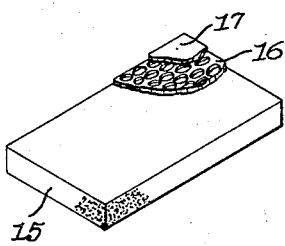
Fig. 4 is a perspective view in which a single reenforcement is employed near one surface of the material.

In Fig. 4 there is illustrated a material comprising a single layer of hard cellular rubber 15 with a perforated sheet metal reenforcement 16 on one surface of the same. For many purposes a single layer of cellular rubber is all that is required and has the advantage of being more readily made to conform to curved surfaces.

In order to protect the surface of the material, I find it desirable in some cases to apply thereto a thin layer or coating of soft vulcanized rubber 17. This may be used on both surfaces, as illustrated in Fig. 1, or upon one only, as illustrated in Figs. 2 and 4.

Figure 5:
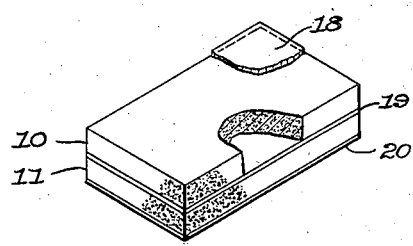
Fig. 5 illustrates a modification in which the reenforcing sheets are of flexible, unperforated sheet metal.

In Fig. 5 is shown a section of material like that previously described except that the two layers of hard vulcanized cellular rubber 10 and 11 are separated by and the outer surfaces thereof covered with three sheets of unperforated thin, flat sheet metal 18, 19 and 20.

As is well known in the art, the cellular character is imparted to the rubber during vulcanization by gases formed from chemicals employed in the rubber mixture. By varying the quantity and the nature of these chemicals, the cellular spaces in the rubber may be made coarse or fine and relatively few or numerous, and, accordingly, the strength-weight ratio of the resulting material may be varied to suit the particular needs. Thus, it is known in the art that various rubber compounds chemically treated and heated afford a range of "blow" or expansion in the production of cellular rubber varying from 40% to 400%. Corresponding variations in the density and strength of the hard vulcanized rubber product are thus obtainable to correspond with requirements. For example, a cellular rubber sheet expanded approximately 140% during the heating and vulcanization process, when reenforced as herein described, has been found to be admirably adapted for the fabrication of hydroplane float skins.

Having thus described my invention, I claim:

1. As a new article of manufacture, a structural member of sheet form having a high strength-weight ratio, comprising a body portion of hard vulcanized cellular rubber, and a reenforcement of sheet metal associated with said body portion and arranged parallel with the surface of said member.

2. As a new article of manufacture, a structural member of sheet form having a high strength-weight ratio, comprising a body portion of hard vulcanized cellular rubber, and a reenforcement of flexible sheet metal intimately associated with said body portion and vulcanized thereto, said sheet metal being arranged parallel with the surface of said member.

3. As a new article of manufacture, a structural member of sheet form having a high strength-weight ratio comprising a body portion of hard vulcanized cellular rubber, and reenforcing material of flexible sheet metal form attached to a surface of said body.

4. As a new article of manufacture, a moisture resisting structural sheet of high strength-weight ratio, comprising a body portion of hard vulcanized cellular rubber, and a plurality of metallic sheets of flexible thin sheet form secured to the cellular body portion in spaced parallel planes.

5. As a new article of manufacture, a structural member of sheet form having a high strength-weight ratio, comprising a body portion of hard vulcanized cellular rubber, and a reenforcement of sheet metal associated with said body portion and arranged parallel with the surface of said member, said reenforcing member having therein a multiplicity of spaces in which said cellular rubber is anchored.

6. As a new article of manufacture, a structural member of sheet form having a high strength-weight ratio, comprising a body portion of hard vulcanized cellular rubber, and reenforcing material of flexible sheet metal form vulcanized to both surfaces of said body.

7. As a new article of manufacture, a moisture resisting structural sheet of high strength-weight ratio, comprising a body portion containing a layer of hard vulcanized cellular rubber, and two metallic reenforcements of flexible thin sheet form vulcanized to the opposite surfaces of said body portion, whereby the sheet is reenforced and fracture under bending stresses in either direction is prevented.

8. As a new article of manufacture, a structural member of sheet form having a high strength-weight ratio, comprising a body portion of hard vulcanized rubber including a layer of hard cellular rubber, and reenforcements of sheet metal vulcanized to the body portion at each surface thereof, said reenforcing sheets having therein a multiplicity of spaces in which the hard rubber of said body portion is anchored.

9. Laminated structural material comprising two facing sheets of metal and a layer of hard sponge rubber lying between them and firmly united with each of the sheets in extensive face-to-face relation.

10. Laminated structural material comprising a facing sheet of metal and a layer of hard sponge rubber united therewith in extensive face-to-face relation.

In testimony whereof, I hereunto affix my signature.

CHARLES A. VAN DUSEN.